(12) United States Patent
Ortiz Egea et al.

(10) Patent No.: US 10,607,352 B2
(45) Date of Patent: Mar. 31, 2020

(54) REDUCED POWER OPERATION OF TIME-OF-FLIGHT CAMERA

(71) Applicant: Microsoft Technology Licensing, LLC, Redmond, WA (US)

(72) Inventors: Sergio Ortiz Egea, San Jose, CA (US); Hung-Ming Lin, San Jose, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 65 days.

(21) Appl. No.: 15/983,054

(22) Filed: May 17, 2018

(65) Prior Publication Data
US 2019/0355136 A1 Nov. 21, 2019

(51) Int. Cl.
| G06K 9/00 | (2006.01) |
| G06T 7/521 | (2017.01) |
| G06T 7/73 | (2017.01) |
| G06T 5/00 | (2006.01) |
| G06T 5/20 | (2006.01) |
| H04N 5/225 | (2006.01) |
| H04N 5/232 | (2006.01) |

(52) U.S. Cl.
CPC .............. *G06T 7/521* (2017.01); *G06T 5/002* (2013.01); *G06T 5/007* (2013.01); *G06T 5/20* (2013.01); *G06T 7/74* (2017.01); *H04N 5/2256* (2013.01); *H04N 5/23241* (2013.01); *G06T 2207/10028* (2013.01); *G06T 2207/10048* (2013.01); *G06T 2207/10152* (2013.01)

(58) Field of Classification Search
CPC . G06T 2207/10028; G06T 2207/10048; G06T 2207/10152; G06T 5/002; G06T 5/007; G06T 5/20; G06T 7/521; G06T 7/74
See application file for complete search history.

(56) References Cited

U.S. PATENT DOCUMENTS

| 6,288,776 B1 | 9/2001 | Cahill et al. |
| 6,456,793 B1 | 9/2002 | Ray et al. |
| 7,187,452 B2 | 3/2007 | Jupp et al. |
| 7,420,656 B1 | 9/2008 | Sandusky et al. |

(Continued)

FOREIGN PATENT DOCUMENTS

WO 2017149370 A1 9/2017

OTHER PUBLICATIONS

Hansard et al., "Time of Flight Cameras: Principles, Methods, and Applications" Springer Briefs in Computer Science, Nov. 2012, 102 pages.

(Continued)

*Primary Examiner* — Charles T Shedrick
(74) *Attorney, Agent, or Firm* — Alleman Hall Creasman & Tuttle LLP

(57) ABSTRACT

A time-of-flight (ToF) camera is configured to operate in a manner that reduces power consumption of the ToF camera. For a key frame, a key-frame depth image is generated based on a plurality of sets of key-frame IR images. Each set of key-frame IR images is acquired using a different modulation frequency of active IR light. For a P-frame after the key frame, a P-frame depth image is generated based on a set of P-frame IR images acquired using a single modulation frequency of active IR light.

20 Claims, 7 Drawing Sheets

(56) References Cited

U.S. PATENT DOCUMENTS

| | | | |
|---|---|---|---|
| 8,780,113 | B1 | 7/2014 | Ciurea et al. |
| 9,165,368 | B2* | 10/2015 | Rafii .................. G06K 9/00201 |
| 9,602,807 | B2 | 3/2017 | Crane et al. |
| 9,625,569 | B2 | 4/2017 | Lange |
| 2010/0140461 | A1 | 6/2010 | Sprigle et al. |
| 2012/0287247 | A1 | 11/2012 | Stenger et al. |
| 2013/0177236 | A1* | 7/2013 | Kim .................. G06K 9/00201 |
| | | | 382/154 |
| 2014/0168369 | A1* | 6/2014 | Crane .................... G01S 17/36 |
| | | | 348/46 |
| 2014/0313376 | A1 | 10/2014 | Van nieuwenhove et al. |
| 2015/0371440 | A1* | 12/2015 | Pirchheim ............... G06T 17/05 |
| | | | 345/419 |
| 2016/0231866 | A1* | 8/2016 | Tretter ...................... G06F 3/14 |
| 2017/0272651 | A1 | 9/2017 | Mathy et al. |
| 2018/0122086 | A1* | 5/2018 | Lu .............................. G06T 7/20 |
| 2018/0343432 | A1* | 11/2018 | Duan ...................... G01S 7/497 |
| 2019/0346570 | A1 | 11/2019 | Ortiz Egea |

OTHER PUBLICATIONS

Bamji et al., "A 0.13 μm CMOS System-on-Chip for a 512 × 424 Time-of-Flight Image Sensor With Multi-Frequency Photo-Demodulation up to 130 MHz and 2 GS/s ADC," IEEE Journal of Solid-State Circuits, vol. 50, No. 1, Jan. 2015, 17 pages.

Droeschel, et al., "Probabilistic Phase Unwrapping for Time-of-Flight Camera", In Proceedings of 41st International Symposium on Robotics, Jun. 7, 2010, pp. 318-324.

"International Search Report and Written Opinion Issued in PCT Application No. PCT/US2019/029529", dated Jun. 28, 2019, 11 Pages.

"International Search Report and Written Opinion Issued in PCT Application No. PCT/US2019/030783", dated Aug. 20, 2019, 10 Pages.

Garcia, et al. "Spatio-temporal Tof Data Enhancement by Fusion", In Proceedings of 19th IEEE International Conference on Image Processing, Sep. 30, 2012, 4 Pages.

Conroy, et al., "A power-saving modulation technique for time-of-flight range imaging sensors", In Proceedings of SPIE Videometrics, Range Imaging, and Applications XI, vol. 8085, Jun. 21, 2011, 13 Pages.

Crabb, et al., "Fast single-frequency time-of-flight range imaging", In Proceedings of IEEE Conference on Computer Vision and Pattern Recognition Workshops, Jun. 7, 2015, pp. 58-65.

Droeschel, et al., "Multi-Frequency Phase Unwrapping for Time-of-Flight Cameras", In Proceedings of IEEE/RSJ International Conference on Intelligent Robots and Systems, Oct. 18, 2010, 7 Pages.

Kirmani, et al., "SPUMIC: Simultaneous Phase Unwrapping and Multipath Interference Cancellation in Time-of-Flight Cameras Using Spectral Methods", In Proceedings of IEEE International Conference on Multimedia and Expo, Jul. 15, 2013, 6 Pages.

Kumar, et al., "Low Power Time-of-Flight 3D Imager System in Standard CMOS", In Proceedings of 19th IEEE International Conference on Electronics, Circuits and Systems, Dec. 9, 2012, pp. 941-944.

Li, Larry, "Time-of-Flight Camera—An Introduction", In Technical White Paper, Jan. 2014, 10 Pages.

* cited by examiner

REDUCED POWER OPERATION OF TIME-OF-FLIGHT CAMERA

BACKGROUND

A time-of-flight (ToF) camera may determine a depth of a subject relative to the ToF camera based on the known speed of light and a measured time of flight of light between the ToF camera and the subject. For example, a light signal may be temporally modulated to illuminate the subject. The back-reflected light signal may be acquired by a sensor array of the ToF camera and evaluated to determine a phase difference from which the depth may be calculated.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A time-of-flight (ToF) camera is configured to operate in a manner that reduces power consumption of the ToF camera. For a key frame, a key-frame depth image is generated based on a plurality of sets of key-frame IR images. Each set of key-frame IR images is acquired using a different modulation frequency of active IR light. For a P-frame after the key frame, a P-frame depth image is generated based on a set of P-frame IR images acquired using a single modulation frequency of active IR light.

DETAILED DESCRIPTION

A time-of-flight (ToF) camera may determine the depth of a subject based on the phase difference of a light signal that is temporally modulated by a time-of-flight illuminator. However, if the subject is positioned at a distance that makes the phase difference greater than $2\pi$, then the subject may be confused with another object that is placed at a distance that is a multiple of $2\pi$. The number of periods added to the phase difference that equates to the distance may be referred to as the 'phase wrapping.' To solve this issue, in one example, a ToF camera modulates an active infrared (IR) light signal using several different modulation frequencies to produce a sparse solution space from which the phase wrapping of the phase difference can be determined and a depth image may be generated. However, this multi-frequency modulation approach requires multiple IR image captures at each of the modulation frequencies in order to generate a depth image. Electronic components of the ToF camera (e.g., an IR laser, sensor array, microcontroller) are activated and consume electrical power for each IR image capture. Accordingly, the greater the number of modulation frequencies, and the greater the number of IR image captures at each frequency, the greater the power consumption of the ToF camera.

Accordingly, this disclosure is directed to an approach for operating a ToF camera in manner that reduces power consumption of the ToF camera. In particular, this approach includes generating key frame depth images for key frames and generating one or more P-frame depth images for one or more successive P-frames between key frames. Each key frame depth image is generated based on a set of IR images for each of a plurality of different modulation frequencies. Each P-frame depth image is generated based on a set of IR images for a single modulation frequency. The P-frame depth image may be generated using a lower number of IR images relative to the number of IR images required to generate a key-frame depth image due to using a single modulation frequency. As such, the P-frame depth image may be generated using less electrical power than the key frame depth image. By generating one or more successive P-frame depth images in between key-frame depth images, power consumption of the ToF camera may be reduced relative to a ToF camera that only generates depth images using the multi-frequency approach (i.e., only generating key frame depth images without generating P-frame depth images).

Figure 1:
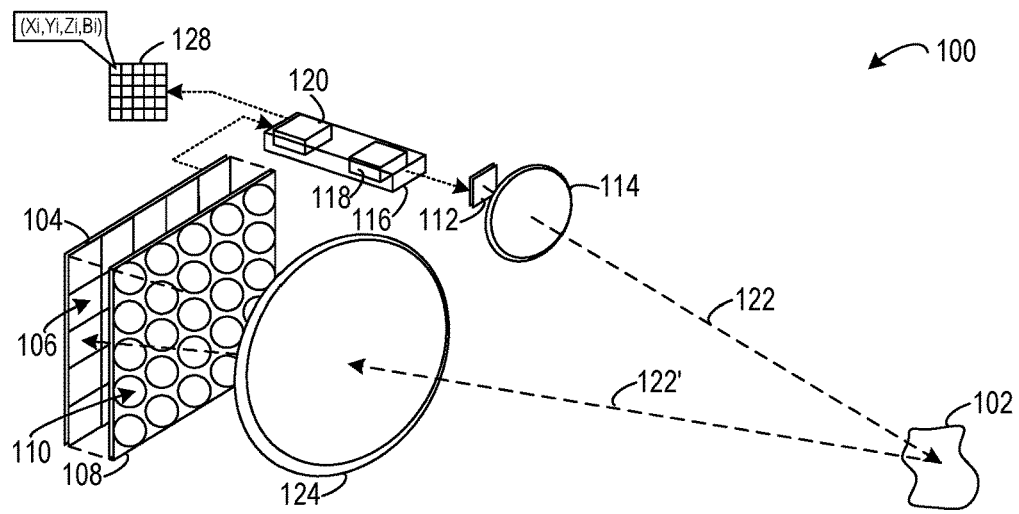
FIG. 1 is an exploded, schematic view showing aspects of an example time-of-flight (ToF) camera.

FIG. 1 shows aspects of an example ToF camera 100 configured to operate in the manner described above. The term 'camera' refers herein to any imaging component having at least one optical aperture and sensor array configured to image a scene or subject 102. Camera 100 includes a sensor array 104 of individually addressable sensors 106. In some implementations, the sensors may be complementary metal-oxide semiconductor (CMOS) elements, but other suitable architectures are also envisaged. Each sensor may be responsive to light over a broad wavelength band, although this is not required. For silicon-based sensors, the wavelength response may range from 300 to 1100 nm, for example. Sensor array 104 is schematically illustrated with only twenty-five sensors 106 for simplicity, although there is no theoretical limitation to the number of sensors 106.

Microlens array 108 optionally may be arranged directly over sensor array 104. Microlens array 108 includes a plurality of microlens elements 110. Each microlens element 110 of microlens array 108 may be registered to a sensor 106 of the sensor array 104. When included, microlens array 108 may provide a larger effective fill factor at each of the sensors, for increased collection efficiency and reduced cross-talk between pixels.

A ToF illuminator 112 is configured to emit active IR light to illuminate the subject 102. In one example, the ToF illuminator 112 includes an IR laser configured to emit IR light. In some implementations, the ToF illuminator 112 optionally may include a diffuser 114 covering a field of illumination of the ToF illuminator 112. In this disclosure, the term 'infrared' (IR) light includes so called near-infrared (NIR) wavelengths of about 850 nm. Depth measurements may be taken using IR light, including NIR light, or any other suitable wavelength. Although not shown in FIG. 1, the camera optionally may include a bandpass filter to limit the portion of the electromagnetic spectrum reaching the sensors 106 to the portion of the electromagnetic spectrum emitted by the ToF illuminator 112.

Electronic controller 116 may include a logic machine and associated storage machine. The storage machine may hold instructions that cause the logic machine to enact any operation, algorithm, computation, or transformation disclosed herein. In some implementations, the logic machine may take the form of an application-specific integrated circuit (ASIC) or system-on-a-chip (SoC), in which some or all of the instructions are hardware- or firmware-encoded. Electronic controller 116 includes a ToF controller machine 118 and an output machine 120 that may be operatively connected to the sensor array 104 and/or the ToF illuminator 112. Machines 118 and 120 may be implemented as separate physical hardware and/or firmware components or incorporated into a single hardware and/or firmware component.

The ToF controller machine 118 is configured to repeatedly activate the ToF illuminator 112 and synchronously address the sensors 106 of sensor array 104 to acquire IR images. The active light signal emitted from the ToF illuminator 116 may be temporally modulated in different modulation frequencies for different IR image captures. In the illustrated example, the ToF controller machine 118 activates the ToF illuminator 112 to illuminate the subject 102 with active IR light 122 and addresses the sensors 106 of sensor array 104 in synchronicity. IR light 122' reflects from the subject 102 back to the camera 100. The reflected IR light 122' passes through receiving optics 124 and is incident on the sensors 106 of the sensor array 104 to provide a measurement. For example, the measurement may be an intensity measurement of active IR light back-reflected from the subject to the sensor. In the illustrated example, IR light 122' is measured by a sensor 106 of sensor array 104, thus providing phase information useable with the knowledge of the camera's configuration to determine the world space position of a locus of subject 102.

The ToF controller machine 118 is configured to generate a depth image 128 based on a plurality of captured IR images. The term 'depth image' refers to an array of pixels registered to corresponding regions $(X_i, Y_i)$ of an imaged scene, with a depth value $Z_i$ indicating, for each pixel, the depth of the corresponding region. 'Depth' is defined as a coordinate parallel to the optical axis of the camera, which increases with increasing distance from the camera. The term 'depth video' refers herein to a time-resolved sequence of depth images. The output machine 120 is configured to output the depth image 128 generated by the ToF controller machine 118. The output machine 120 may be configured to output the depth image 128 in any suitable form. In some examples, the output machine 120 may output the depth image 128 as a data structure in which each element of the matrix corresponds to a different pixel.

The ToF camera 100 is configured to generate key-frame depth images based on sets of key-frame IR images acquired for the key frame. The key-frame sets of IR images are acquired for a plurality of different modulation frequencies of IR light emitted from the ToF illuminator 112. Note that a set of key-frame IR images may include one or more key-frame IR images.

Figure 2:
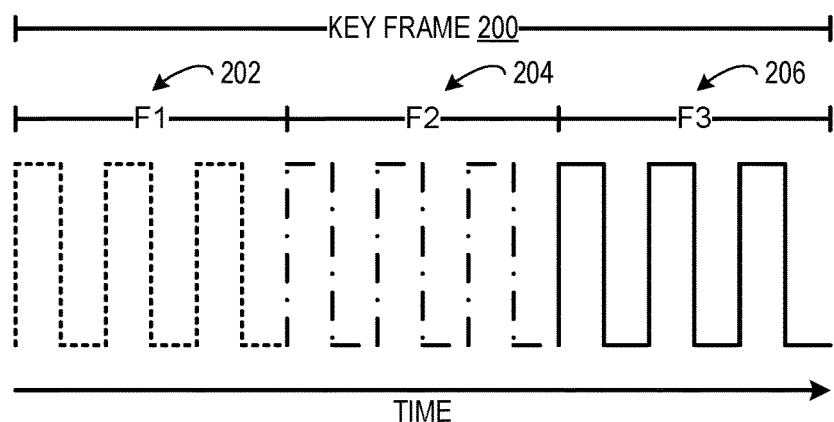
FIG. 2 is a timing graph showing an example operating sequence of a ToF illuminator for acquiring a set of key-frame infrared (IR) images for each of a plurality of different modulation frequencies for a key frame.

FIG. 2 shows an example operating sequence of the ToF illuminator to acquire a plurality of sets of key-frame IR images for a key frame 200. In particular, during a first collection period 202 of the key frame 200, the ToF illuminator is activated to emit IR light modulated at a first modulation frequency (F1 indicated in dotted lines) to acquire a first set of three IR images. Next, during a second collection period 204 of the key frame 200, the ToF illuminator is activated to emit IR light modulated at a second modulation frequency (F2 indicated by dot-dashed lines) to acquire a second set of three IR images. Finally, during a third collection period 206 of the key frame 200, the ToF illuminator is activated to emit IR light modulated at a third modulation frequency (F3 indicated by solid lines) to acquire a third set of three IR images. The total collection duration of the key frame may be equally divided between the three collection periods 202, 204, 206. In one example, the frame rate of the ToF camera is thirty-three frames per second, and each of the three collection periods of the key frame is eleven milliseconds. In the illustrated example, nine total key-frame IR images are acquired during collection duration of the key frame 200. In other examples, a different number of key-frame IR images may be acquired for each key frame. The three modulation frequencies (F1, F2, F3) may be any suitable different modulation frequencies. In one example, the second modulation frequency is higher than the first modulation frequency and the third modulation frequency is higher than the second modulation frequency. In other examples, the ToF illuminator may be modulated in a different number of modulation frequencies (e.g., two modulation frequencies or four or more modulation frequencies).

This multi-frequency modulation approach used for the key frames requires a relatively high number of IR image captures that causes the ToF camera 100 to consume a relatively high amount of electrical power. To reduce the power consumption of the ToF camera 100, the ToF camera 100 is configured to generate one or more P-frame depth images for one or more successive P-frames between key frames. Each P-frame depth image may be generated based on a set of P-frame IR images acquired for the P-frame. Note that a set of P-frame IR images may include one or more P-frame IR images. The set of P-frame IR images is acquired for a single modulation frequency. In one example, one third of the number of IR images may be captured for a P-frame relative to the number of IR images that are captured for a key frame.

Figure 3:
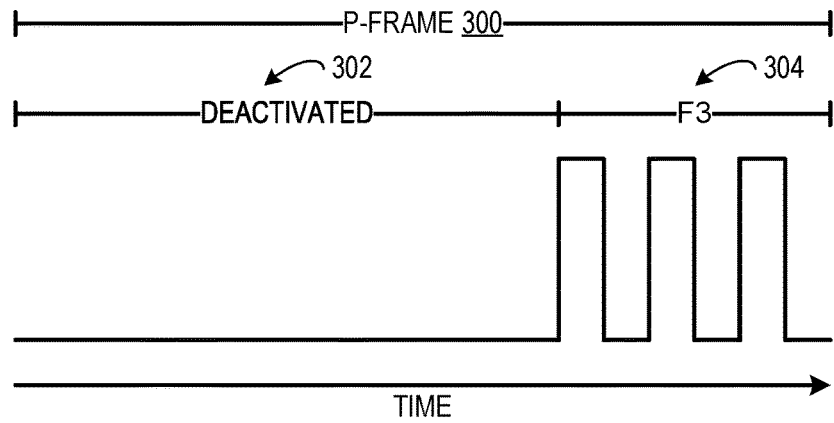
FIG. 3 is a timing graph showing an example operating sequence of a ToF illuminator for acquiring a set of P-frame IR images for a single modulation frequency for a P-frame.

FIG. 3 shows an example operating sequence of the ToF illuminator to acquire a set of P-frame IR images for a P-frame 300. In particular, during a first period 302 of the P-frame 300, the ToF illuminator remains deactivated. In one example, the first period 302 of the P-frame 300 may be temporally equivalent to a sum of the first collection period 202 and the second collection period 204 of the key frame 200. During a second period 304 of the P-frame 300, the ToF illuminator is activated to emit IR light modulated at a single modulation frequency to acquire a set of three IR images. In the illustrated example, three total P-frame IR images are acquired during the total duration of the P-frame. In other examples, a different number of P-frame IR images may be acquired for each P-frame.

The single modulation frequency of IR light imaged for the P-frame may be any suitable modulation frequency. In one example, the single modulation frequency is equivalent to the third modulation frequency (F3) of the key frame. Typically, the modulation frequency used for the P-frame may be a high frequency. By using a high modulation frequency for the P-frame, a more accurate depth measurement may be obtained. Although, in some implementations, different modulation frequencies may be used for different P-frames.

Because the ToF illuminator, the sensor array, and other electronic components of the ToF camera may remain deactivated during the first period 302 of the P-frame, power consumption of the ToF camera may be reduced. This may be particularly beneficial in implementations where the ToF camera is incorporated into a battery-powered device, such as a smartphone, a head-mounted, near-eye display device, or other mobile computing devices. Furthermore, because IR images are not generated during the first period 302 of the P-frame, processing resources of the ToF camera may be directed to other processing operations that may result in more efficient operation of the ToF camera.

Figure 4:
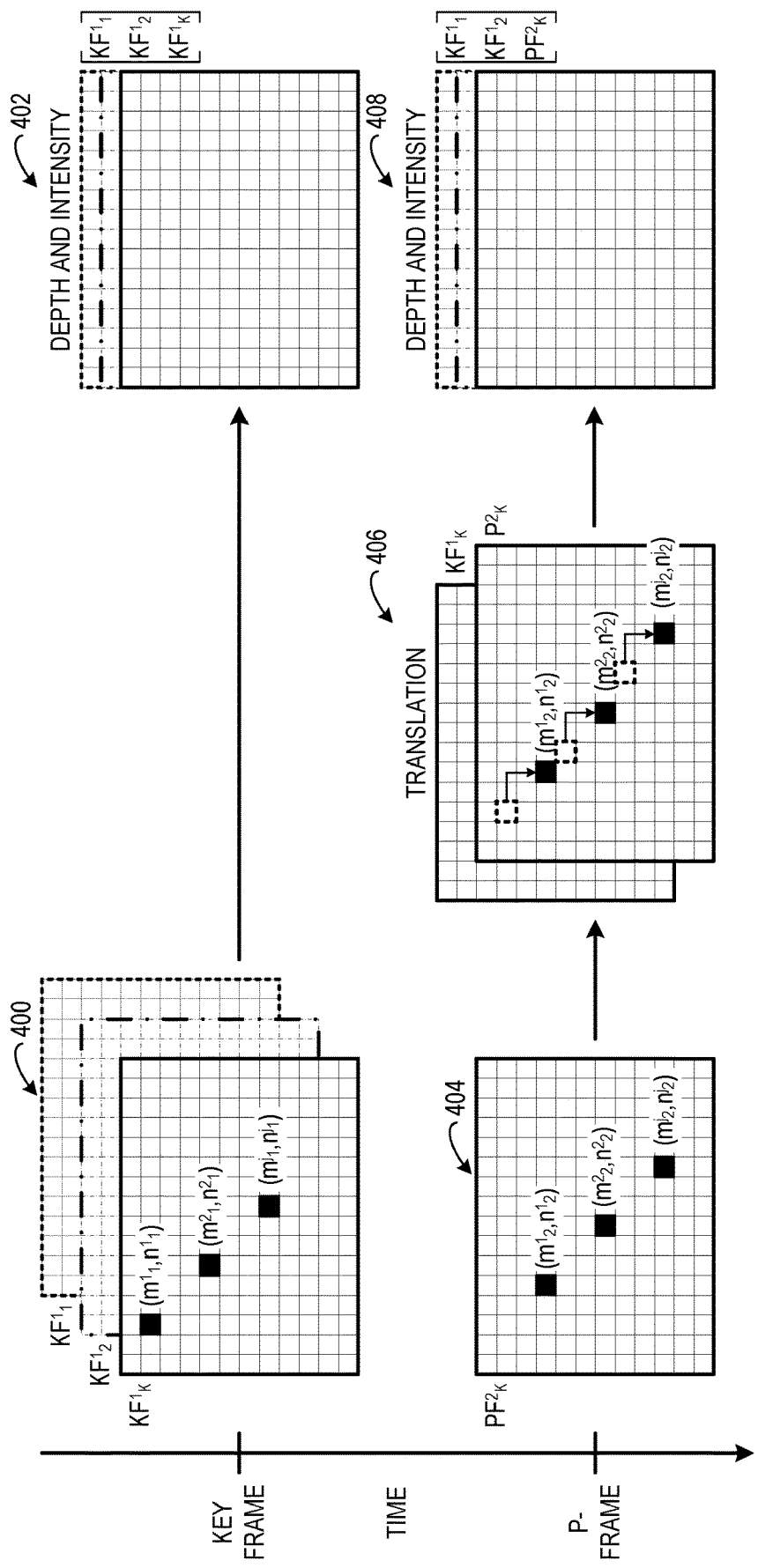
FIG. 4 schematically shows an example approach for generating a key-frame depth image and subsequently generating a P-frame depth image based on a positional translation of features identified in the key-frame and the P-frame.

FIG. 4 schematically shows an example approach for generating a key-frame depth image and subsequently generating a P-frame depth image. In particular, for a key frame ($KF^1$), the ToF controller machine 118 is configured to acquire a plurality of sets of key-frame IR images 400 for a plurality of different modulation frequencies. In this example, the number of different modulation frequencies is represented by (K), and each set of key-frame IR images includes one key-frame IR image. A key-frame IR image for a first modulation frequency ($KV^1_1$) is depicted with dotted lines. A key-frame IR image for a second modulation frequency ($KF^1_2$) is depicted with dashed lines. A key-frame IR image for a $K^{th}$ modulation frequency ($KF^1_K$) is depicted in solid lines. In this example, the $K^{th}$ modulation frequency is the highest frequency of the plurality of different modulation frequencies.

In some implementations, various processing operations may be performed on the plurality of sets of key-frame IR images 400 to increase the accuracy of determined depth and intensity values. In one example, the ToF controller machine 118 is configured to perform an intensity de-noising operation on the plurality of sets key-frame IR images. Any suitable intensity de-noising operation may be performed. In one example, the intensity de-noising operation includes applying a low-pass filter to the plurality of sets of key-frame IR images. In another example, the ToF controller machine 118 is configured to perform a spatial frequency reduction operation on the plurality of sets of key-frame IR images. Any suitable spatial frequency reduction operation may be performed. In another example, the ToF controller machine 118 is configured to perform a dynamic range reduction operation on the plurality of sets of key-frame IR images. In one example, the dynamic range reduction operation includes applying a Napierian logarithm to the plurality of sets of key-frame IR images. The logarithm may reduce the dynamic range of the active brightness in order to reduce stretching effects on values in very bright or dark areas of the key-frame IR images.

The plurality of sets of key-frame IR images 400 acquired for the key frame ($KF^1$) may be used to generate a key-frame depth image 402. In the illustrated example, each set only includes a single image, although each set may include more images. The ToF controller machine 118 is configured to produce a sparse solution space from the plurality of sets of key-frame IR images 400 from which the phase wrapping of the phase difference of the IR light is determined and the key-frame depth image 402 is generated. Because the depth information can be determined from the plurality of sets of key-frame IR images 400, the key-frame depth image 402 can be generated without using information from any other frames (e.g., other key frames or P-frames). Additionally, the ToF controller machine 118 may be configured to generate a key-frame IR intensity image based on the plurality of key-frame IR images 400. The key-frame IR intensity image may include, for each sensor of the sensor array, an IR light intensity value.

Furthermore, the ToF controller machine 118 may identify one or more features of the imaged scene based on the plurality of sets of key-frame IR images 400. Any suitable number of features may be identified and/or tracked from frame to frame. In this example, the number of different features is represented by (j). In the depicted example, in the key-frame IR image for the $K^{th}$ modulation frequency, a first feature has a position ($m_1^1$, $n_1^1$), a second feature has a position ($m_1^2$, $n_1^2$), and a $j^{th}$ feature has a position ($m_1^j$, $n_1^j$), where m represents the row, and n represents the column of the IR image. The position of the identified features may be tracked from the key frame to the P-frame to determine a positional translation that may be used to determine a phase wrapping applied to P-frame IR images acquired for the P-frame to generate a P-frame depth image.

For a P-frame ($PF^2$) after the key frame ($KF^1$), the ToF controller machine 118 is configured to acquire a set of P-frame IR images 404 for a single modulation frequency (K). In this example, the set includes a single P-frame IR image ($PF_K^2$) depicted in solid lines. In this example, the single modulation frequency (K) corresponds to the highest modulation frequency (K) of the plurality of modulation frequencies of the key frame ($KF^1$).

In some implementations, various processing operations may be performed on the set of P-frame IR images 404 to increase the accuracy of determined depth and intensity values. In one example, the ToF controller machine 118 is configured to perform an intensity de-noising operation on the set of P-frame IR images. Any suitable intensity de-noising operation may be performed. In one example, the intensity de-noising operation includes applying a low-pass filter to the set of key-frame IR images. In another example, the ToF controller machine 118 is configured to perform a spatial frequency reduction operation on the set of P-frame IR images. Any suitable spatial frequency reduction operation may be performed. In one example, the spatial frequency reduction operation includes applying a Napierian logarithm to the set of P-frame IR images. In another example, the ToF controller machine 118 is configured to perform a dynamic range reduction operation on the plurality of sets of P-frame IR images. In one example, the dynamic range reduction operation includes applying a Napierian logarithm to the plurality of sets of key-frame IR images.

The ToF controller machine 118 is configured to identify the features of the imaged scene based on the set of P-frame IR images 404. In the depicted example, the first feature has an updated position ($m_2^1$, $n_2^1$), the second feature has an updated position ($m_2^2$, $n_2^2$), and the $j^{th}$ feature has an updated position ($m_2^j$, $n_2^j$) for the P-frame ($PF^2$). The ToF controller machine 118 is configured to determine a positional translation 406 of these features from the set of key-frame IR images for the modulation frequency (K) to the set of P-frame IR images. In one example, the positional translation 406 includes a horizontal and vertical shift that is applied to the sets of key-frame IR images for the other modulation frequencies based on the change in position of the tracked features such that the key-frame IR images are registered to the P-frame IR images. After the ToF controller machine 118 applies the positional translation to the sets of key-frame IR images, the ToF controller machine 118 may be configured to crop the key-frame IR images to match the P-frame IR images. The ToF controller machine 118 is configured to generate a P-frame depth image 408 based at least on the set of P-frame IR images acquired for the single modulation frequency (K) and the positional translation of the features of the scene. More particularly, the ToF controller machine 118 may be configured to generate the P-frame depth image 408 also based on the translated and cropped key-frame IR images for the other modulation frequencies.

Figure 5:
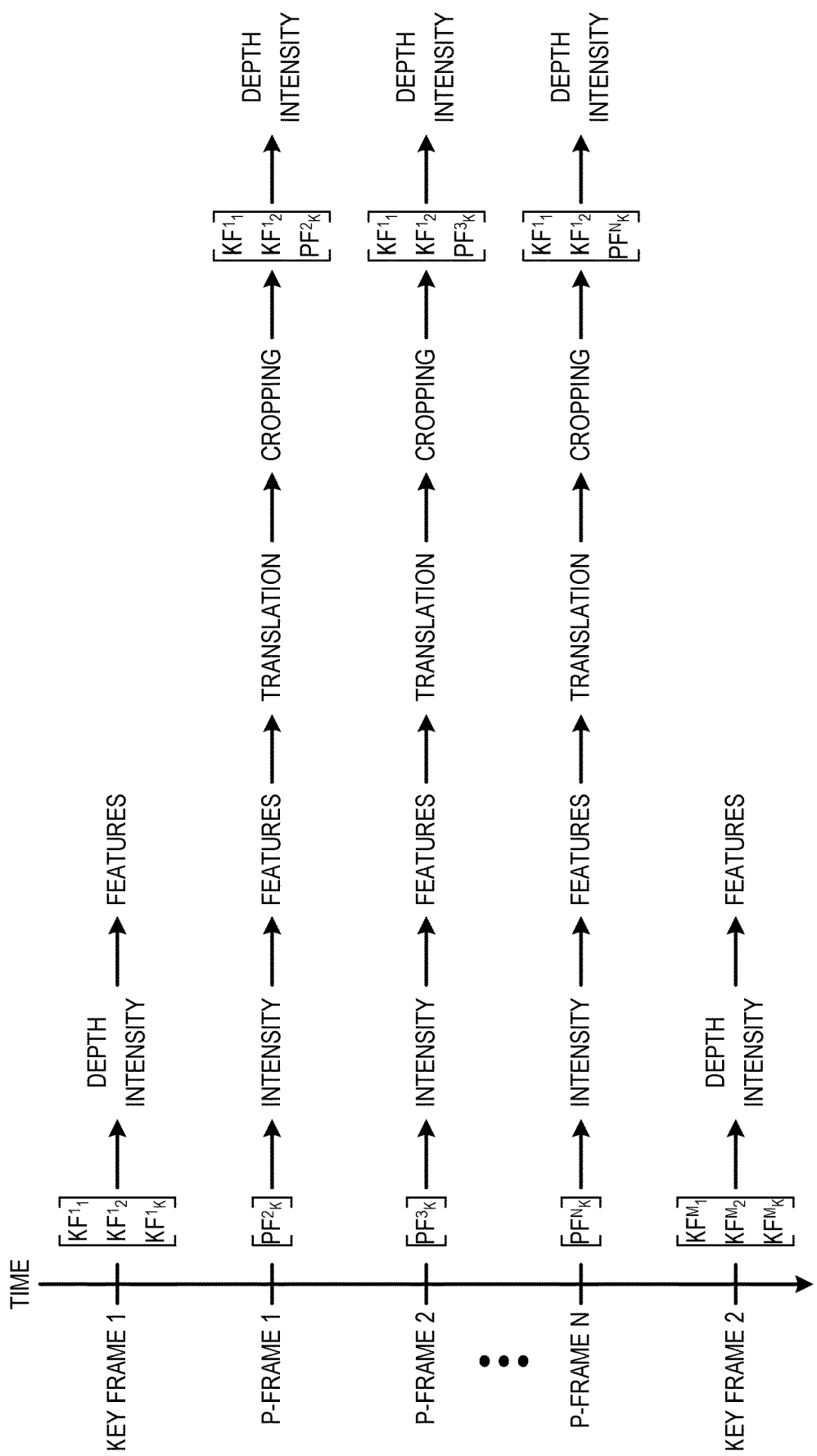
FIG. 5 shows example ToF camera operations that are performed for a plurality P-frames between key frames.

This approach for generating a P-frame depth image may be repeatedly performed any suitable number of times for successive P-frames between generating key-frame depth images for key frames. FIG. 5 shows example operations that are performed for a plurality P-frames between key frames. For the first key frame ($KF^1$), the ToF controller machine 118 generates a key-frame depth image and a key-frame IR intensity image based on a plurality of sets of key-frame IR images generated for each of a plurality of different modulation frequencies (1, 2, K). Furthermore, the ToF controller machine 118 identifies features in the plurality of sets of key-frame IR images. For a first P-frame ($PF^2$) after the first key frame ($KF^1$), the ToF controller machine 118 generates a set of P-frame IR images for a single modulation frequency (K). The ToF controller machine 118 identifies features in the set of P-frame IR images, and determines a positional translation of the identified features from the set of key-frame IR images for the highest modulation frequency (K) to the set of P-frame IR images. In other words, the IR images for the same modulation frequency are compared to determine the positional translation of the features in the scene. The ToF controller machine 118 horizontally and/or vertically shifts the key-frame IR images for the other modulation frequencies based on the determined positional translation of the identified features. The ToF controller machine 118 crops the shifted sets of key-frame IR images for the other modulation frequencies. The ToF controller machine 118 generates the P-frame depth image based on the set of P-frame IR images for the modulation frequency K of the first P-frame ($PF^2$) and the plurality of shifted and cropped key-frame IR images for the other modulation frequencies (1, 2) of the first key frame ($KF^1$).

P-frame depth images for subsequent P-frames ($PF^3$-$PF^N$) are generated in the same manner as the first P-frame ($PF^2$). In particular, for each P-frame, the positions of the features identified for the P-frame are compared to the positions of the features in the key frame to determine the positional translation that is applied to the plurality of key-frame IR images for the other modulation frequencies. The P-frame depth image is generated based on the set of P-frame IR images for the P-frame and the positional translation of the identified features from the prior key frame to the P-frame. In some implementations, positional translation may be intermediately tracked from P-frame to P-frame.

Any suitable number of P-frame depth images may be generated for successive P-frames between key frames. In some implementations, the number of successive P-frames between key frames may be predetermined or fixed. For example, a fixed number ranging between three and five P-frame depth images may be generated between key frame depth images.

In other implementations, the ToF controller machine is configured to dynamically adjust the number of successive P-frames between key frames. The number of successive P-frames between key frames may be dynamically adjusted based on any suitable operating parameter or condition. In one example, the ToF controller machine 118 is configured to dynamically adjust the number of successive P-frames between key frames based on an amount of positional translation of one or more features identified in key-frame IR images and P-frame IR images. For example, if the identified feature(s) change position by less than a threshold amount between the key frame and the current P-frame, then the next frame is designated as a P-frame and another P-frame depth image is generated. If the identified feature(s) change position by greater than or equal to the threshold amount between the key frame and the current P-frame, then the next frame is designated as a key frame and a key-frame depth image is generated. According to such an approach, the depth of quick moving objects in a scene may be accurately measured while also reducing power consumption of the ToF camera.

In the above described approach, a P-frame depth image is generated based on the positional translation of feature(s) identified in IR images of a key frame and a P-frame. Such an approach may be implemented in a standalone ToF camera. In some implementations, a ToF camera may be incorporated into a device that includes one or more motion sensors external to the ToF camera, such as a mobile computing device (e.g., smartphone, augmented-reality device, near-eye display device). A non-limiting example of motion sensors that are configured to determine a position of the ToF camera include an inertial measurement unit (IMU) including accelerometers and/or gyroscopes. In such implementations, the information from the motion sensors may be leveraged by the ToF camera to determine a change in perspective of the ToF camera between a key frame and a P-frame that may be used to generate a P-frame depth image. In this approach, features of the scene do not need to be identified and tracked from frame to frame in order to generate a P-frame depth image. As such, this approach may be less processing resource intensive than the feature tracking approach. Although such feature tracking also may be performed in some implementations.

Figure 6:
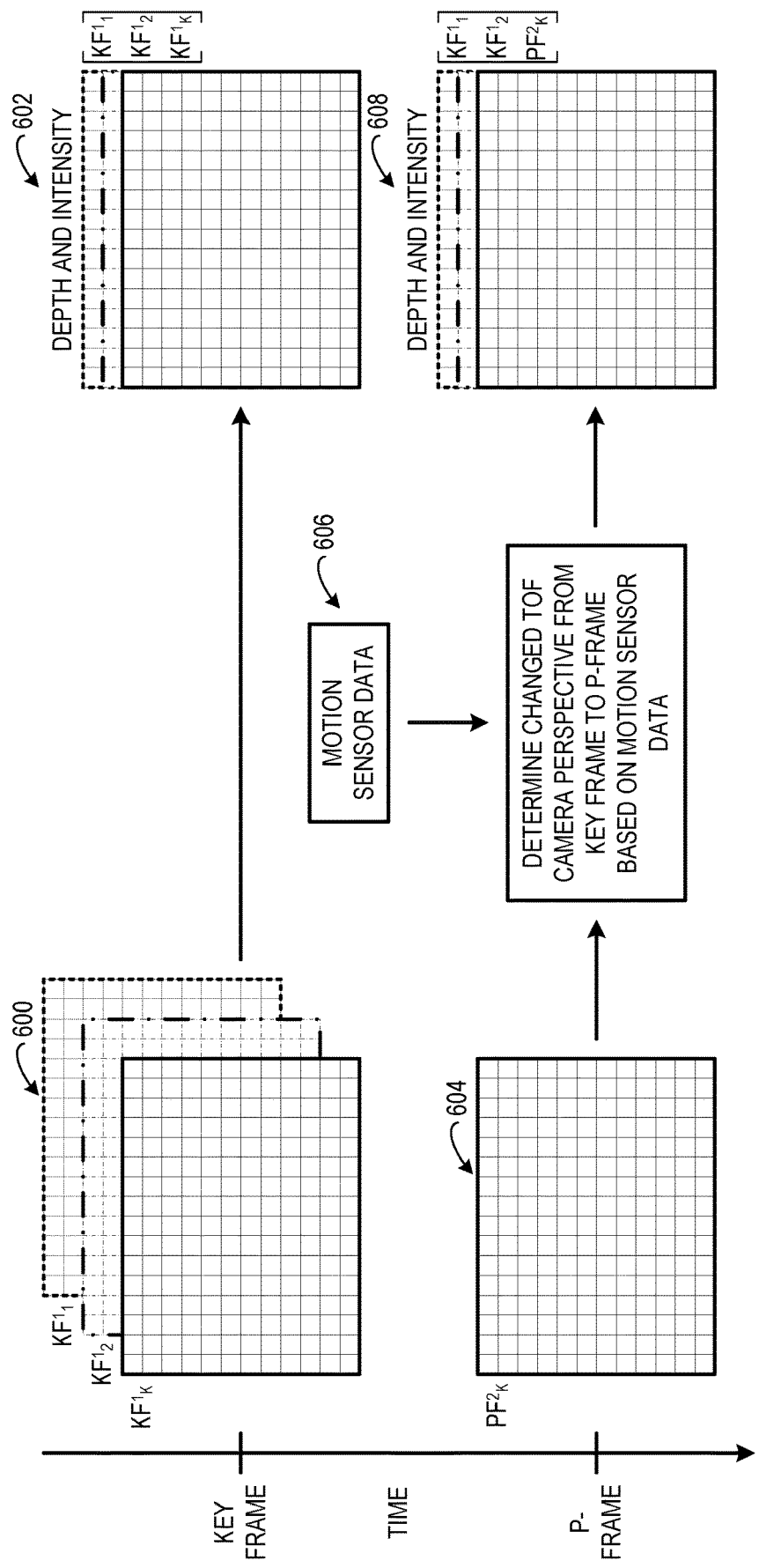
FIG. 6 schematically shows an example approach for generating a key-frame depth image and subsequently generating a P-frame depth image based on a changed perspective that is determined based on motion data from one or more motion sensors.

FIG. 6 schematically shows an example approach for generating a key-frame depth image and subsequently generating a P-frame depth image based on a changed perspective of the ToF camera from the key frame to the P-frame that is determined based on motion sensor data. In particular, for a key frame ($KF^1$), the ToF controller machine 118 is configured to acquire a plurality of sets of key-frame IR images 600 for each of a plurality of different modulation frequencies. Note that each set of key-frame IR images may include one or more key-frame IR images. The plurality of sets of key-frame IR images 600 acquired for the key frame ($KF^1$) may be used to generate a key-frame depth image 602. In particular, the ToF controller machine 118 is configured to produce a sparse solution space from the plurality of key-frame IR images 600 from which the phase wrapping of the phase difference of the IR light is determined and the key-frame depth image 602 is generated.

For a P-frame ($PF^2$) after the key frame ($KF^1$), the ToF controller machine 118 is configured to acquire a set of P-frame IR images 604 for a single modulation frequency (K). A set including a single P-frame IR image ($PF_K^2$) is depicted. In this example, the single modulation frequency (K) corresponds to the highest modulation frequency (K) of the plurality of modulation frequencies of the key frame (KF1). The controller machine 118 is configured to receive motion data 606 from the motion sensor(s). The ToF controller machine 118 is configured to determine a changed perspective of the ToF camera based on detected motion from the key frame (KF[1]) to the P-frame (PF[2]). The ToF controller machine 118 is configured to shift the key-frame IR images of the sets for the other modulation frequencies such the key-frame IR images are registered to the set of P-frame IR images based on the determined changed perspective of the ToF camera. The ToF controller machine 118 is configured to crop the shifted key-frame IR images. The ToF controller machine 118 is configured to generate the P-frame depth image 608 based on the set of P-frame IR images for the modulation frequency K of the first P-frame (PF[2]) and the sets of shifted and cropped key-frame IR images for the other modulation frequencies (1, 2) of the first key frame (KF[1]). This approach for generating a P-frame depth image may be repeatedly performed any suitable number of times for successive P-frames between generating key-frame depth images for key frames.

Figure 7A:
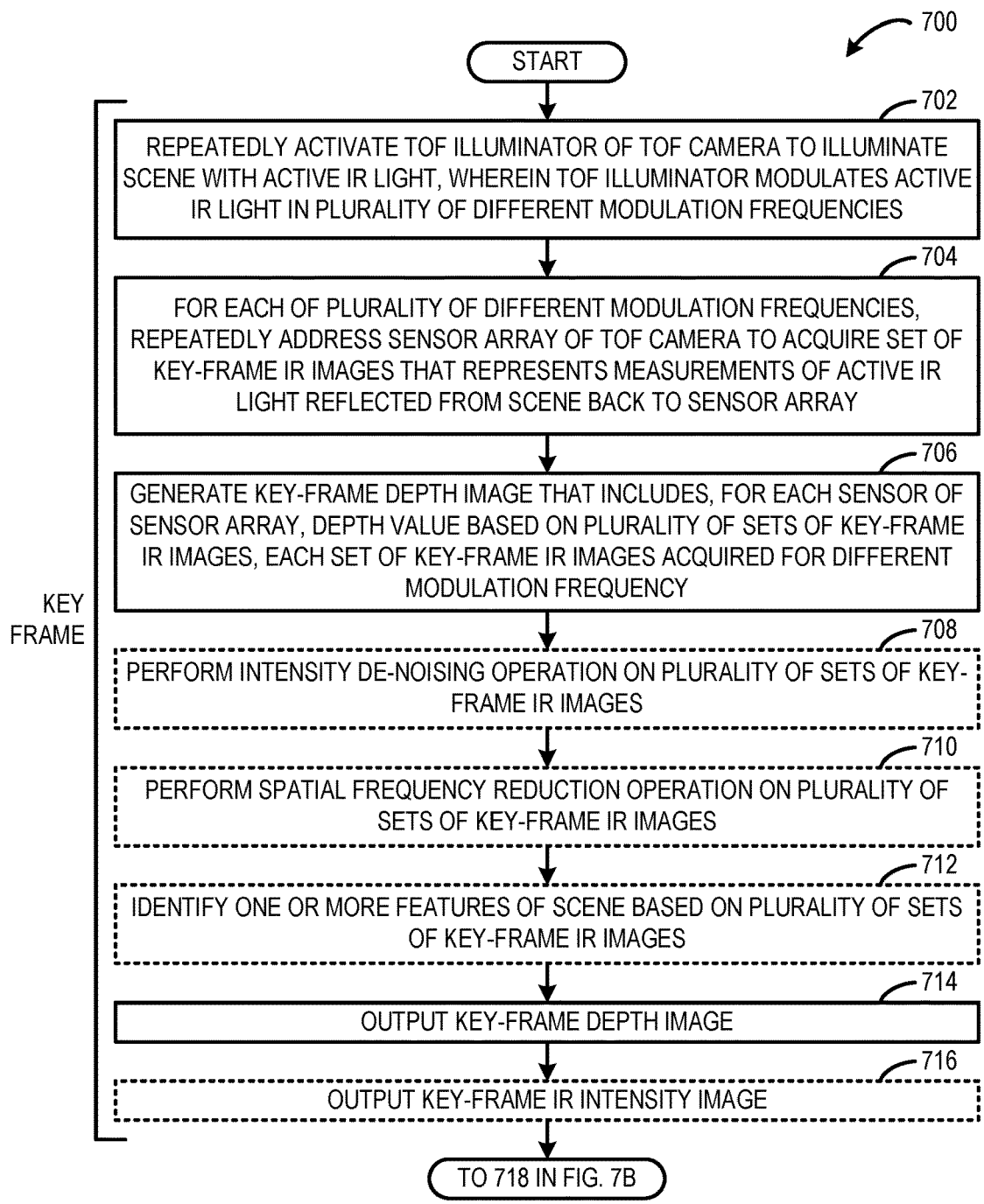
FIGS. 7A-7B are a flowchart of an example method for acquiring a plurality of depth images in a manner that reduces power consumption of a ToF camera.
Figure 7B:
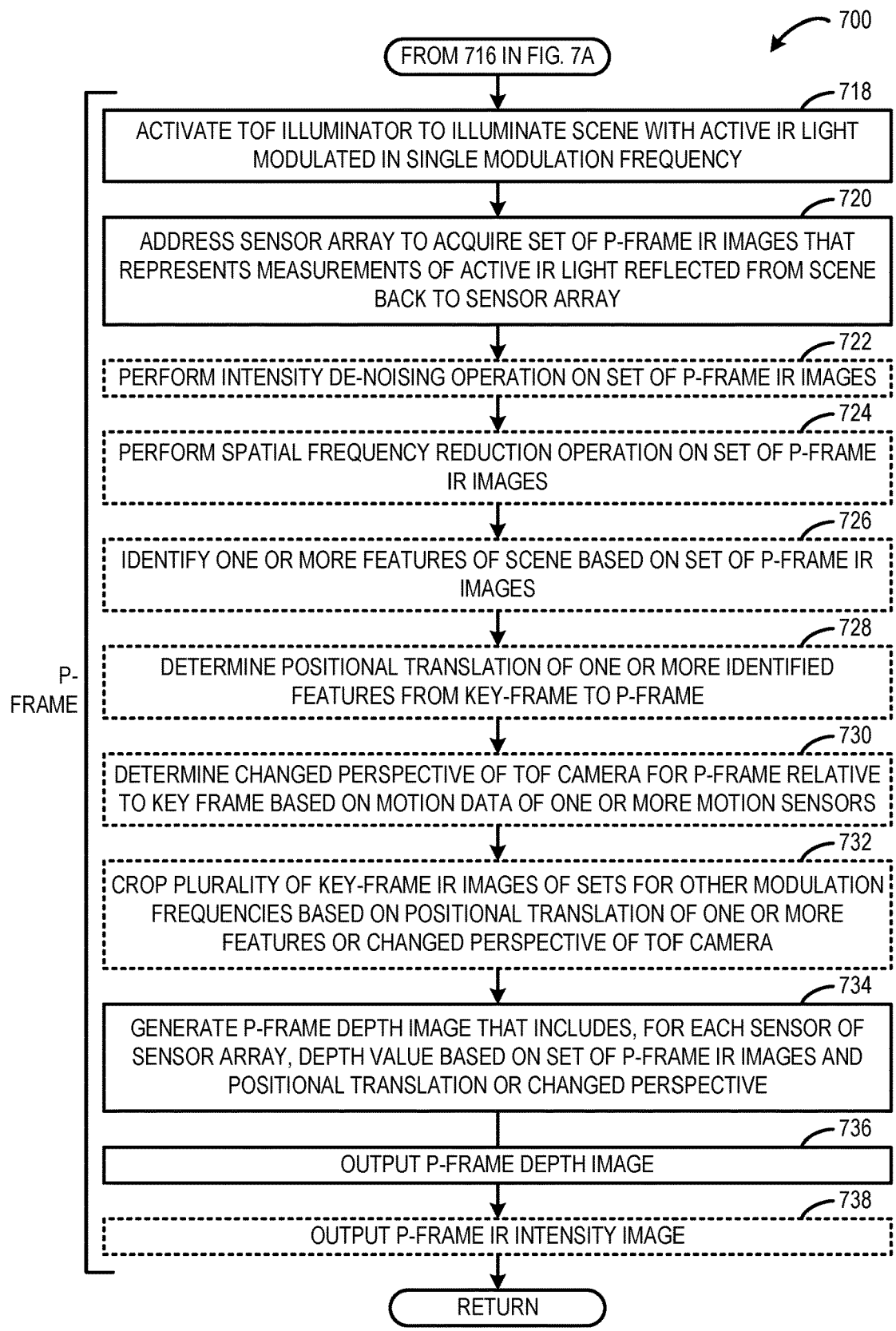

FIGS. 7A-7B depict a flowchart of an example method 700 for generating depth images in a manner that reduces power consumption of a ToF camera. For example, method 700 may be enacted by electronic controller 116 of camera 100.

In FIG. 7A, at 702 of method 700, for a key frame, a ToF illuminator of a ToF camera is repeatedly activated to illuminate a scene with active IR light. The ToF modulates the active IR light in a plurality of different modulation frequencies. At 704 of method 700, for each of the plurality of different modulation frequencies, a sensor array of the ToF camera is repeatedly addressed to acquire a set of key-frame IR images that represent measurements of the active IR light reflected from the scene back to the sensor array. At 706 of method 700, a key-frame depth image is generated based on a plurality of sets of key-frame IR images. Each set of key-frame IR images is acquired using a different modulation frequency of active IR light. The key frame depth image includes a depth value for each sensor of the sensor array.

In some implementations, at 708 of method 700, an intensity de-noising operation optionally may be performed on the plurality of sets of key-frame IR images. At 710 of method 700, a spatial frequency reduction operation optionally may be performed on the plurality of sets of key-frame IR images. At 712 of method 700, one or more features of the scene optionally may be identified based on the plurality of sets of key-frame IR images. The feature(s) may be identified in implementations where a positional translation of the identified features is used to generate a P-frame depth image.

At 714 of method 700, a key-frame depth image is output from the ToF camera. In some implementations, at 716 of method 700, a key frame IR intensity image optionally may be output from the ToF camera.

In FIG. 7B, at 718 of method 700, for a P-frame, the ToF illuminator is activated to illuminate the scene with active IR light in a single modulation frequency. At 720 of method 700, the sensor array is addressed to acquire a set of P-frame IR images that represents measurements of the active IR light reflected from the scene back to the sensor array.

In some implementations, at 722 of method 700, an intensity de-noising operation optionally may be performed on the set of P-frame IR images. At 724 of method 700, a spatial frequency reduction operation optionally may be performed on the set of P-frame IR images. At 726 of method 700, one or more features of the scene optionally may be identified based the set of P-frame IR images. At 728 of method 700, a positional translation of the one or more identified features from the key-frame to the P-frame optionally may be determined. In implementations where features are identified in the IR images, the positional translation of the identified features may be applied to sets of key-frame IR images for the other modulation frequencies, and these translated key-frame IR images may be used to generate the P-frame depth image. At 730 of method 700, a changed perspective of the ToF camera for the P-frame relative to the key frame optionally may be determined based on motion data of one or more motion sensors. In implementations where motion data is received from one or more motion sensors, the changed perspective of the ToF camera determined from the motion data may be used to translate the sets of key-frame IR images for the other modulation frequencies, and these translated sets of key-frame IR images may be used to generate the P-frame depth image. At 734 of method 700, the sets of key-frame IR images for the other modulation frequencies optionally may be cropped based on the positional translation of the identified features or the changed perspective of the ToF camera.

At 734 of method 700, a P-frame depth image is generated based on the set of P-frame IR images and the positional translation of the identified features or the changed perspective of the ToF camera. The P-frame depth image includes depth values for each sensor of the sensor array. In implementations where the identified features are tracked from the key frame to the P-frame, the sets of key-frame IR images that are translated based on the positional translation of the identified features are used with the set of P-frame IR images to generate the P-frame depth image. In implementations where the perspective of the ToF camera is tracked from the key frame to the P-frame, the sets of key-frame IR images that are translated based on the changed perspective of the ToF camera are used with the set of P-frame IR images to generate the P-frame depth image.

At 736 of method 700, the P-frame depth image is output from the ToF camera. In some implementations, at 738 of method 700, a P-frame IR intensity image optionally may be output from the ToF camera. Portions of method 700 may be repeated to generate key-frame depth images for key frames and P-frame depth images for one or more successive P-frames between key frames.

Figure 8:
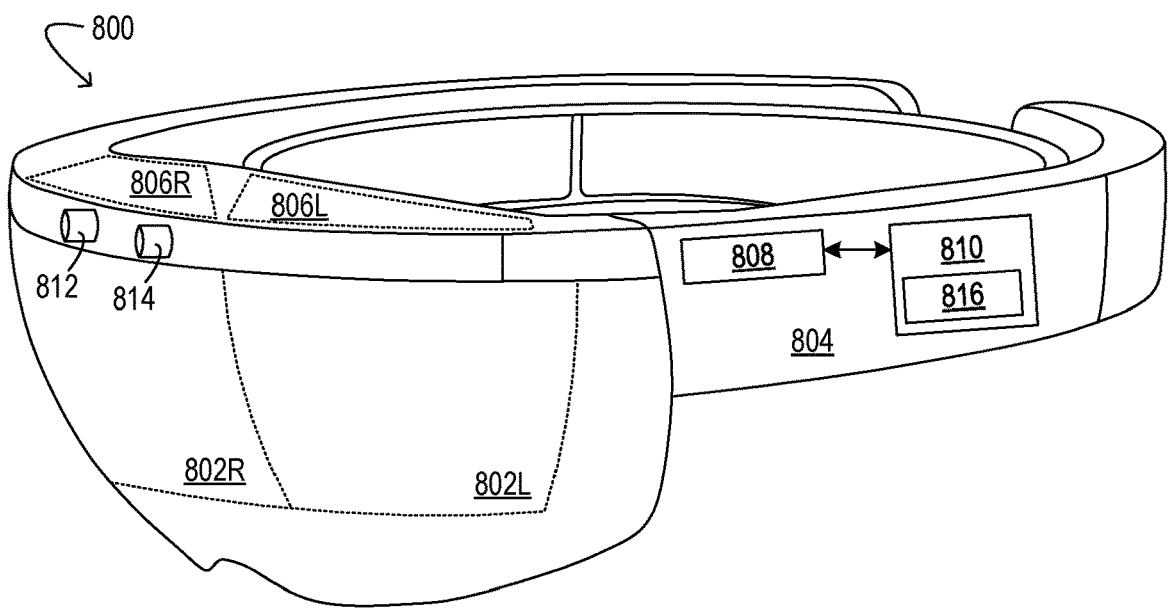
FIG. 8 shows an example near-eye display device.

FIG. 8 shows aspects of a near-eye display device 800 in which a ToF camera may be incorporated. Near-eye display device 800 is a binocular, near-eye display device with see-thru display windows 802R and 802L and a frame 804 configured to rest on a user's head. Near-eye display device 800 includes right microdisplay 806R and left microdisplay 806L. The right and left microdisplays are configured to project computerized virtual display imagery onto right and left display windows 802R and 802L, respectively. The microdisplays are driven by an on-board computer 808. When the right and left display images are composed and presented in an appropriate manner on display windows 802R and 802L, the user experiences an illusion of one or more virtual objects at specified positions, and having specified 3D content and other display properties. Such virtual imagery may have any desired complexity; it may, for example, comprise a complete virtual scene having both foreground and background portions.

Near-eye display device 800 includes a sensor subsystem 810 operatively coupled to computing system 806. Sensor subsystem 808 includes a world-facing ToF camera 812 configured to image any or all aspects of the user's environment, including one or more real objects. For example, depth images from the world-facing ToF camera 812 may be provided to computing system 808, for the purpose of reconstructing the environment virtually. Sensor subsystem 810 may include a discrete flat-imaging camera 814 arranged with an optical axis oriented in the same direction as an optical axis of ToF camera 812. In some implementations, image or video output from the flat-imaging camera and output from the ToF camera may be co-registered and combined into a unitary (e.g., RGB+depth) data structure or stream. In some examples, a data stream representing both depth and brightness (e.g., IR+depth) may be available by combining outputs differing in phase.

Sensor subsystem includes a position sensor 816 configured to sense a position and orientation of the near-eye display device 800 relative to an object in the environment, or to some other locus of reference. The position sensor may include an inertial measurement unit (IMU) including one or more accelerometers, gyroscopes, and magnetometers, and/or a global positioning system (GPS) receiver. In some implementations, the position sensor returns a six degrees-of-freedom (6DOF) estimate of the three Cartesian coordinates of the near-eye display device, plus a rotation about each of the three Cartesian axes. The output of the position sensor may be used to map the position, size, and orientation of virtual display objects (defined globally) onto the right and left display windows 802 of the near-eye display device 800. Sensor subsystem 810 may include any suitable type of sensor including one or more motion sensors configured to determine a position and/or orientation of the near-eye display device 800.

Sensors of sensor subsystem 810 may be configured to send sensor data to the ToF camera 812 to indicate a changed perspective of the ToF camera 812 that may be used by the ToF camera 812 to generate P-frame depth images in the manner described herein.

In some implementations, the methods and processes described herein may be tied to a computing system of one or more computing devices. In particular, such methods and processes may be implemented as a computer-application program or service, an application-programming interface (API), a library, and/or other computer-program product.

Figure 9:
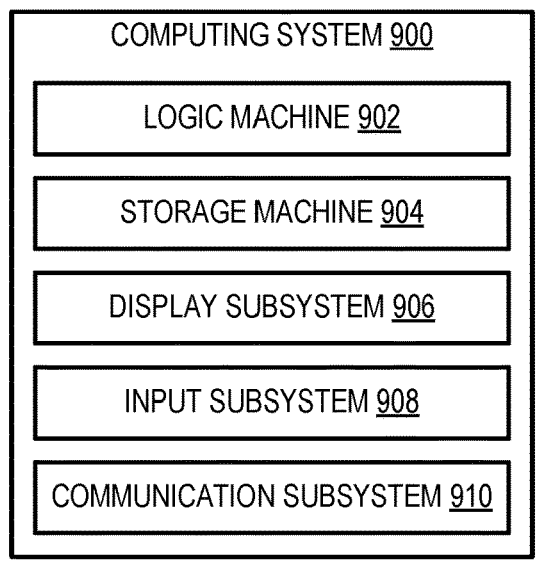
FIG. 9 shows an example computing system.

FIG. 9 schematically shows a non-limiting implementation of a computing system 900 that can enact one or more of the methods and processes described above. Computing system 900 is shown in simplified form. For example, computing system 900 may take the form of camera 100 or electronic controller 116 of FIG. 1.

Computing system 900 includes a logic machine 902 and a storage machine 904. Computing system 900 may optionally include a display subsystem 906, input subsystem 908, communication subsystem 910, and/or other components not shown in FIG. 900.

Logic machine 902 includes one or more physical devices configured to execute instructions. For example, the logic machine 902 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 902 may include one or more processors configured to execute software instructions. Additionally or alternatively, the logic machine 902 may include one or more hardware or firmware logic machines configured to execute hardware or firmware instructions. Processors of the logic machine 902 may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine 902 may be virtualized and executed by remotely accessible, networked computing devices configured in a cloud-computing configuration.

Storage machine 904 includes one or more physical devices configured to hold instructions executable by the logic machine 902 to implement the methods and processes described herein. When such methods and processes are implemented, the state of storage machine 904 may be transformed—e.g., to hold different data.

Storage machine 904 may include semiconductor memory (e.g., RAM, EPROM, EEPROM, etc.), and/or magnetic memory (e.g., hard-disk drive, floppy-disk drive, tape drive, MRAM, etc.), among others. Storage machine 904 may include volatile, nonvolatile, dynamic, static, read/write, read-only, random-access, sequential-access, location-addressable, file-addressable, and/or content-addressable devices.

It will be appreciated that storage machine 904 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 902 and storage machine 904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 906 may be used to present a visual representation of data held by storage machine 904. This visual representation may take the form of display images translating matrix of pixels 126 into a visual format perceivable by a human. As the herein described methods and processes change the data held by the storage machine, and thus transform the state of the storage machine, the state of display subsystem 906 may likewise be transformed to visually represent changes in the underlying data. Display subsystem 906 may include one or more display devices utilizing virtually any type of technology. Such display devices may be combined with logic machine 902 and/or storage machine 904 in a shared enclosure, or such display devices may be peripheral display devices.

When included, input subsystem 908 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 910 may be configured to communicatively couple computing system 900 with one or more other computing devices. Communication subsystem 910 may include wired and/or wireless communication devices compatible with one or more different communication protocols. As non-limiting examples, the communication subsystem 910 may be configured for communication via a wireless telephone network, or a wired or wireless local- or wide-area network. In some embodiments, the communication subsystem 910 may allow computing system 900 to send and/or receive messages to and/or from other devices via a network such as the Internet.

In an example, a time-of-flight (ToF) camera comprises a ToF illuminator configured to emit active IR light, a sensor array including a plurality of sensors each configured to measure active IR light, and a ToF controller machine configured to, for a key frame, repeatedly activate the ToF illuminator to illuminate a scene with active IR light, wherein the ToF illuminator modulates the active IR light in a plurality of different modulation frequencies, for each of the plurality of different modulation frequencies, repeatedly address the sensor array to acquire a set of key-frame IR images that each represent measurements of the active IR light reflected from the scene back to the sensor array, generate a key-frame depth image that includes, for each sensor of the sensor array, a depth value based on a plurality of sets of key-frame IR images, each set of key-frame IR images acquired using a different modulation frequency of active IR light, and identify one or more features of the scene based on the plurality of sets of key-frame IR images, for a P-frame occurring after the key frame, activate the ToF illuminator to illuminate the scene with active IR light modulated in a single modulation frequency, address the sensor array to acquire a set of P-frame IR images that represents measurement of the active IR light reflected from the scene back to the sensor array, identify the one or more features of the scene based on the set of P-frame IR images, determine a positional translation of the one or more features from the key-frame to the P-frame, and generate a P-frame depth image that includes, for each sensor of the sensor array, a depth value based at least on the set of P-frame IR images acquired using the single modulation frequency of active IR light and the positional translation of the one or more features of the scene, and an output machine operatively connected to the sensor array and configured to output the key-frame depth image and the P-frame depth image. In this example and/or other examples, the ToF controller machine may be configured to generate a plurality of P-frame depth images for successive P-frames between key frames. In this example and/or other examples, the ToF controller machine may be configured to dynamically adjust a number of successive P-frames between key frames based on an amount of positional translation of the one or more features. In this example and/or other examples, the single modulation frequency may be a highest modulation frequency of the plurality of different modulation frequencies. In this example and/or other examples, the ToF controller machine may be configured to generate the P-frame depth image also based on the sets key-frame IR images for the modulation frequencies other than the single modulation frequency of the P-frame. In this example and/or other examples, the ToF controller machine may be configured to crop the key-frame IR images for the modulation frequencies other than the single modulation frequency based on the positional translation of the one or more features, and the ToF controller machine may be configured to generate the P-frame depth image also based on the cropped key-frame IR images. In this example and/or other examples, the ToF controller machine may be configured to perform an intensity de-noising operation on the plurality of sets of key-frame IR images and the set of P-frame IR images. In this example and/or other examples, the intensity de-noising operation may include applying a low-pass filter to the plurality of sets of key-frame IR images and the sets of P-frame IR images. In this example and/or other examples, the ToF controller machine may be configured to perform a spatial frequency reduction operation on the plurality of sets of key-frame IR images and the set of P-frame IR images. In this example and/or other examples, the ToF controller machine may be configured to perform a dynamic range reduction operation on the plurality of sets of key-frame IR images and the set of P-frame IR images.

In an example, a ToF camera comprises a ToF illuminator configured to emit active IR light, a sensor array including a plurality of sensors, and a ToF controller machine configured to for a key frame, generate a key-frame depth image that includes, for each sensor of the plurality of sensors of the sensor array, a depth value based on a plurality of sets of key-frame IR images, each set of key-frame IR images acquired using a different modulation frequency of active IR light, for a P-frame occurring after the key frame, generate a P-frame depth image that includes, for each sensor of the plurality of sensors of the sensor array, a depth value based on a single set of P-frame IR images acquired using a single modulation frequency of active IR light, and an output machine operatively connected to the sensor array and configured to output the key-frame depth image and the P-frame depth image. In this example and/or other examples, the ToF controller machine may be configured to, for the key frame, repeatedly activate the ToF illuminator to illuminate a scene with active IR light, wherein the ToF illuminator modulates the active IR light in a plurality of different modulation frequencies, for each of the plurality of different modulation frequencies, repeatedly address the sensor array to acquire a set of key-frame IR images that represent measurements of the active IR light reflected from the scene back to the sensor array, for each sensor of the plurality of sensors of the sensor array, determine a depth value based on the plurality of sets of IR images, identify one or more features of the scene based on the plurality of sets of key-frame IR images, for the P-frame, activate the ToF illuminator to illuminate the scene with active IR light modulated in the single modulation frequency, address the sensor array to acquire the set of P-frame IR images that represents measurement of the active IR light reflected from the scene back to the sensor array, identify the one or more features of the scene based on the set of P-frame IR images, determine a positional translation of the one or more features from the key-frame to the P-frame, and wherein each depth value of the P-frame depth image is determined based on the single set of P-frame IR images and the positional translation of the one or more features of the scene. In this example and/or other examples, the ToF camera may further comprise one or more motion sensors configured to measure a position of the ToF camera, and the ToF controller machine may be configured to for the key frame, repeatedly activate the ToF illuminator to illuminate a scene with active IR light, wherein the ToF illuminator modulates the active IR light in a plurality of different modulation frequencies, for each of the plurality of different modulation frequencies, repeatedly address the sensor array to acquire a set of key-frame IR images that represent measurements of the active IR light reflected from the scene back to the sensor array, for each sensor of the plurality of sensors of the sensor array, determine a depth value based on the plurality of sets of IR images, for the P-frame, activate the ToF illuminator to illuminate the scene with active IR light modulated in the single modulation frequency, address the sensor array to acquire a set of IR images that represent measurements of the active IR light reflected from the scene back to the sensor array, determine a changed perspective of the ToF camera from the key frame to the P-frame based on motion data of the one or more motion sensors, and wherein each depth value of the P-frame depth image is determined based on the single set of P-frame IR images and the changed perspective of the ToF camera. In this example and/or other examples, the ToF controller machine may be configured to generate a plurality of P-frame depth images for successive P-frames between key frames. In this example and/or other examples, the ToF controller machine may be configured to dynamically adjust a number of successive P-frames between key frames based on an amount that a perspective of the ToF camera changes from the key frame to the P-frame. In this example and/or other examples, the ToF controller machine may be configured to dynamically adjust a number of successive P-frames between key frames based on an amount that one or more features identified in the plurality of sets of key frame IR images and the set of P-frame IR images moves from the key frame to the P-frame. In this example and/or other examples, the ToF controller machine may be configured to generate the P-frame depth image also based on the sets of key-frame IR images for the modulation frequencies other than the single modulation frequency of the P-frame. In this example and/or other examples, the ToF controller machine may be configured to crop the key-frame IR images for the modulation frequencies other than the single modulation frequency based on the positional translation of the changed perspective of the ToF camera, and the ToF controller machine may be configured to generate the P-frame depth image also based on the cropped key-frame IR images. In this example and/or other examples, the ToF controller machine may be configured to perform one or more of an intensity de-noising operation on the plurality of key-frame IR images, perform a spatial frequency reduction operation on the plurality of key-frame IR images and the plurality of P-frame IR images, and a dynamic range reduction operation on the plurality of sets of key-frame IR images and the set of P-frame IR images.

In an example, a time-of-flight (ToF) method, comprises generating a key-frame depth image that includes, for each of a plurality of sensors in a sensor array, a depth value based on a plurality of sets of key-frame (infrared) IR images, each set of key-frame IR images acquired using a different modulation frequency of active IR light, and generating a P-frame depth image that includes, for each of the plurality of sensors in the sensor array, a depth value based on a single set of P-frame IR images acquired using a single modulation frequency of active IR light.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A time-of-flight (ToF) camera comprising:
a ToF illuminator configured to emit active IR light;
a sensor array including a plurality of sensors each configured to measure active IR light; and
a ToF controller machine configured to:
for a key frame:
repeatedly activate the ToF illuminator to illuminate a scene with active IR light, wherein the ToF illuminator modulates the active IR light in a plurality of different modulation frequencies,
for each of the plurality of different modulation frequencies, repeatedly address the sensor array to acquire a set of key-frame IR images that each represent measurements of the active IR light reflected from the scene back to the sensor array,
generate a key-frame depth image that includes, for each sensor of the sensor array, a depth value based on a plurality of sets of key-frame IR images, each set of key-frame IR images acquired using a different modulation frequency of active IR light, and
identify one or more features of the scene based on the plurality of sets of key-frame IR images,
for a P-frame occurring after the key frame:
activate the ToF illuminator to illuminate the scene with active IR light modulated in a single modulation frequency,
address the sensor array to acquire a set of P-frame IR images that represents measurement of the active IR light reflected from the scene back to the sensor array,
identify the one or more features of the scene based on the set of P-frame IR images,
determine a positional translation of the one or more features from the key-frame to the P-frame, and
generate a P-frame depth image that includes, for each sensor of the sensor array, a depth value based at least on the set of P-frame IR images acquired using the single modulation frequency of active IR light and the positional translation of the one or more features of the scene; and
an output machine operatively connected to the sensor array and configured to output the key-frame depth image and the P-frame depth image.

2. The ToF camera of claim 1, wherein the ToF controller machine is configured to generate a plurality of P-frame depth images for successive P-frames between key frames.

3. The ToF camera of claim 1, wherein the ToF controller machine is configured to dynamically adjust a number of successive P-frames between key frames based on an amount of positional translation of the one or more features.

4. The ToF camera of claim 1, wherein the single modulation frequency is a highest modulation frequency of the plurality of different modulation frequencies.

5. The ToF camera of claim 1, wherein the ToF controller machine is configured to generate the P-frame depth image also based on the sets key-frame IR images for the modulation frequencies other than the single modulation frequency of the P-frame.

6. The ToF camera of claim 5, wherein the ToF controller machine is configured to crop the key-frame IR images for the modulation frequencies other than the single modulation frequency based on the positional translation of the one or more features, and wherein the ToF controller machine is configured to generate the P-frame depth image also based on the cropped key-frame IR images.

7. The ToF camera of claim 1, wherein the ToF controller machine is configured to perform an intensity de-noising operation on the plurality of sets of key-frame IR images and the set of P-frame IR images.

8. The ToF camera of claim 7, wherein the intensity de-noising operation includes applying a low-pass filter to the plurality of sets of key-frame IR images and the sets of P-frame IR images.

9. The ToF camera of claim 1, wherein the ToF controller machine is configured to perform a spatial frequency reduction operation on the plurality of sets of key-frame IR images and the set of P-frame IR images.

10. The ToF camera of claim 9, wherein the ToF controller machine is configured to perform a dynamic range reduction operation on the plurality of sets of key-frame IR images and the set of P-frame IR images.

11. A ToF camera comprising:
a ToF illuminator configured to emit active IR light;
a sensor array including a plurality of sensors; and
a ToF controller machine configured to:
for a key frame, generate a key-frame depth image that includes, for each sensor of the plurality of sensors of the sensor array, a depth value based on a plurality of sets of key-frame IR images, each set of key-frame IR images acquired using a different modulation frequency of active IR light,
for a P-frame occurring after the key frame, generate a P-frame depth image that includes, for each sensor of the plurality of sensors of the sensor array, a depth value based on a single set of P-frame IR images acquired using a single modulation frequency of active IR light; and
an output machine operatively connected to the sensor array and configured to output the key-frame depth image and the P-frame depth image.

12. The ToF camera of claim 11, wherein the ToF controller machine is configured to:
for the key frame:
repeatedly activate the ToF illuminator to illuminate scene with active IR light, wherein the ToF illuminator modulates the active IR light in a plurality of different modulation frequencies,
for each of the plurality of different modulation frequencies, repeatedly address the sensor array to acquire a set of key-frame IR images that represent measurements of the active IR light reflected from the scene back to the sensor array,
for each sensor of the plurality of sensors of the sensor array, determine a depth value based on the plurality of sets of IR images,
identify one or more features of the scene based on the plurality of sets of key-frame IR images,
for the P-frame:
activate the ToF illuminator to illuminate the scene with active IR light modulated in the single modulation frequency,
address the sensor array to acquire the set of P-frame IR images that represents measurement of the active IR light reflected from the scene back to the sensor array,
identify the one or more features of the scene based on the set of P-frame IR images,
determine a positional translation of the one or more features from the key-frame to the P-frame, and
wherein each depth value of the P-frame depth image is determined based on the single set of P-frame IR images and the positional translation of the one or more features of the scene.

13. The ToF camera of claim 11, further comprising:
one or more motion sensors configured to measure a position of the ToF camera;
wherein the ToF controller machine is configured to:
for the key frame:
repeatedly activate the ToF illuminator to illuminate a scene with active IR light, wherein the ToF illuminator modulates the active IR light in a plurality of different modulation frequencies,
for each of the plurality of different modulation frequencies, repeatedly address the sensor array to acquire a set of key-frame IR images that represent measurements of the active IR light reflected from the scene back to the sensor array,
for each sensor of the plurality of sensors of the sensor array, determine a depth value based on the plurality of sets of IR images,
for the P-frame:
activate the ToF illuminator to illuminate the scene with active IR light modulated in the single modulation frequency,
address the sensor array to acquire a set of IR images that represent measurements of the active IR light reflected from the scene back to the sensor array,
determine a changed perspective of the ToF camera from the key frame to the P-frame based on motion data of the one or more motion sensors, and
wherein each depth value of the P-frame depth image is determined based on the single set of P-frame IR images and the changed perspective of the ToF camera.

14. The ToF camera of claim 11, wherein the ToF controller machine is configured to generate a plurality of P-frame depth images for successive P-frames between key frames.

15. The ToF camera of claim 14, wherein the ToF controller machine is configured to dynamically adjust a number of successive P-frames between key frames based on an amount that a perspective of the ToF camera changes from the key frame to the P-frame.

16. The ToF camera of claim 14, wherein the ToF controller machine is configured to dynamically adjust a number of successive P-frames between key frames based on an amount that one or more features identified in the plurality of sets of key frame IR images and the set of P-frame IR images moves from the key frame to the P-frame.

17. The ToF camera of claim 11, wherein the ToF controller machine is configured to generate the P-frame depth image also based on the sets of key-frame IR images for the modulation frequencies other than the single modulation frequency of the P-frame.

18. The ToF camera of claim 17, wherein the ToF controller machine is configured to crop the key-frame IR images for the modulation frequencies other than the single modulation frequency based on the positional translation of the changed perspective of the ToF camera, and wherein the ToF controller machine is configured to generate the P-frame depth image also based on the cropped key-frame IR images.

19. The ToF camera of claim 11, wherein the ToF controller machine is configured to perform one or more of an intensity de-noising operation on the plurality of key-frame IR images, a spatial frequency reduction operation on the plurality of key-frame IR images and the plurality of P-frame IR images, and a dynamic range reduction operation on the plurality of sets of key-frame IR images and the set of P-frame IR images.

20. A time-of-flight (ToF) method, comprising:
generating a key-frame depth image that includes, for each of a plurality of sensors in a sensor array, a depth value based on a plurality of sets of key-frame (infrared) IR images, each set of key-frame IR images acquired using a different modulation frequency of active IR light; and
generating a P-frame depth image that includes, for each of the plurality of sensors in the sensor array, a depth value based on a single set of P-frame IR images acquired using a single modulation frequency of active IR light.

* * * * *